United States Patent [19]

Merwin

[11] 3,753,240

[45] Aug. 14, 1973

[54] DATA ENTRY AND RETRIEVAL COMPOSITE DISPLAY SYSTEM

[75] Inventor: Roy L. Merwin, Jordon, Minn.

[73] Assignee: Dynamic Information Systems, Inc., Burnsville, Minn.

[22] Filed: Mar. 8, 1971

[21] Appl. No.: 122,003

[52] U.S. Cl. .............................................. 340/172.5
[51] Int. Cl. .............................................. H01j 31/10
[58] Field of Search .................... 340/172.5; 178/6.8

[56] References Cited

UNITED STATES PATENTS

| | | | |
|---|---|---|---|
| 3,200,194 | 8/1965 | Rabinow | 178/6.8 X |
| 3,387,084 | 6/1968 | Hine et al. | 178/6.8 |
| 3,403,391 | 9/1968 | McCown | 340/324 |
| 3,569,619 | 3/1971 | Simjian | 178/6.8 |
| 3,629,840 | 12/1971 | Cullen | 340/172.5 |
| 3,641,555 | 2/1972 | Griffin | 340/172.5 |

*Primary Examiner*—Gareth D. Shaw
*Assistant Examiner*—Paul R. Woods
*Attorney*—Reif & Gregory

[57] ABSTRACT

A data entry and retrieval composite display system which by electronic means transforms film, microfiche, transparent slides, video tape data and like data into a video signal and combines the same with computer originated data reduced to a video signal and displays the combined signals as a composite video display embodying the use of integrated electronic control and operating apparatus and programming, providing for selective electronic blanking and substitution of data, for electronic verification of identity of data and for electronic registration of position of data.

10 Claims, 4 Drawing Figures

INVENTOR.
ROY L. MERWIN
BY
Reif and Gregory
ATTORNEYS

INVENTOR.
ROY L. MERWIN
BY
Reif and Gregory
ATTORNEYS

Patented Aug. 14, 1973 3,753,240

3 Sheets-Sheet 3

INVENTOR.
ROY L. MERWIN

BY

Reifand Gregory
ATTORNEYS

DATA ENTRY AND RETRIEVAL COMPOSITE DISPLAY SYSTEM

BACKGROUND AND SUMMARY OF THE INVENTION

The use of a computer to generate, store, and retrieve significant amounts of data that does not require computer treatment is becoming a matter of substantial economic concern in the art. Much user data is relatively static data and is not subject to frequent change. In contrast thereto there is also significant dynamic data used in connection therewith required to update the static data or to present current data in connection with static data.

It is not unusual to provide information from a computer source and independently provide information from another source such as from microfilm or a slide film storage facility and to display the data from each source simultaneously as in a side by side view using pairs of display screens or cathode ray tubes or as a composite display by use of optical means.

It is desirable to utilize both relatively expensive computer storage facilities and other relatively inexpensive storage facilities with both being accessible to and controlled by a common electronic operating apparatus and to combine data from both sources into a composite video signal for an integrated presentation on a single display.

There is known art with respect to a composite display as disclosed by U. S. Letters Pat. No. 3,387,084 dated June 4th, 1968 issued to J. T. Hine et al. Hine presents data from microfilm and alpha numeric characters as a composite image. He generates characters with a character generator and in connection with an optical interface converts the characters into video signals. Optical means are used to merge data from the two sources and combine them into integrated video signals. However, exact registration and dynamic blanking are difficult of attainment at best with optical means.

A significant improvement in the structure disclosed herein is present in the use of electronic means to convert data such as slide film data and computer originated data into composite video signals whereby exact registration is obtainable and a selective blanking technique is used for substitution of data and for supplementing and deleting data. Hine does not provide for selective blanking.

Further, Hine uses a drum as a storage facility or as a memory block with the distinct functions of containing a program of dynamic data and instructions for providing data, for identification and registration of data and for timing the system. The very structure of the drum places distinct limitations upon the system. Hine does not provide for verification of identity of data.

The disclosure herein provides for limited usage of a computer as a source of dynamic data and of instructions and in connection therewith substantial use of a relatively inexpensive data storage facility. The disclosure herein also provides for verification and registration principally by electronic means and results in a system with significant capability and flexibility.

It is one object of this invention therefore to provide for the use of a relatively inexpensive storage facility for large quantities of relatively stable or static data.

It is another object of this invention to utilize frequently changing or dynamic data from a computer storage facility for combination with less frequently changing or static data from a substantially less expensive storage facility.

It is a further object of this invention to combine static data from one storage facility and dynamic data from a separate independent source by electronic means to provide integrated data for a composite display.

It is also an object of this invention to provide a computer program to access, transmit, and control the simultaneous display of both dynamic and static data with said dynamic and static data each being in an independent storage facility, to integrate said data, to format data and properly register updated dynamic data in integrating the same with said static data.

More generally stated it is an object of this invention to provide a microfilm, microfiche or slide source of static data, electronic means to accurately position or achieve precise registration of the static, electronic and optical means to convert said static data into a video signal, means having access to data from a computer storage facility and electronically converting the same into a video signal, providing electronic means for combining the video signal comprising static data with the video signal from the computer source of data into a composite video signal to be displayed on a single monitor, and having in connection with the computer source of data a program including instructions designed to control the integration of said data from their respective sources, to substitute dynamic data for specified static data, delete specified static data or supplement static data whereby data from two independent sources is integrated and modified as desired for a composite display and to provide for verification of identity of and registration of said data.

The above general statement embodies the concept of converting data from a microfilm or slide source into a video signal and combining this video signal with a video signal from a computer source for a composite display.

The system herein embodies the substitution of dynamic data for certain static data by the use of a selective video blanking technique. The system herein also embodies the technique of having the data from independent sources in registration on a single display.

As a result of the basic concept of integrating data from independent sources, there results significant savings in having a minimum use of a computer facility for storage of data, and this further results in significant savings with respect to the reduction in transmission time required by reason of having a reduced quantity of material for transmission from a computer facility and it also results in significant savings in not requiring high speed transmission for the limited amount of the data being transmitted. The dynamic data used which would come from the computer is generally a small portion of the total data used in any given display presentation. The system herein permits the use of relatively inexpensive storage facilities for the greater mass of data which is static and which it is desirable to have locally available. The inexpensive storage facilities may be located near the point of usage and thus require no voice grade line transmission facilities. The system herein also permits access to a plurality of displays for simultaneous presentation.

It is also an object of this invention to clearly indicate that there is embodied within the concept herein the use of a plurality of computer sources of dynamic data and/or a plurality of sources of static data integrated for a unitary output by electronic means as for presentation or display on a single monitor.

These and other objects and advantages of the invention will be set forth in the following description made in connection with the accompanying drawings in which like reference characters refer to similar parts throughout the several views and in which FIG. 1 is a functional flow diagram showing the arrangement and operating relationship of the basic apparatus embodied herein;

BRIEF DESCRIPTION OF A PREFERRED EMBODIMENT

The description of the embodiment presented herein is to be regarded as an example of one application of the concept comprising the subject matter of the invention herein.

Figure 1:
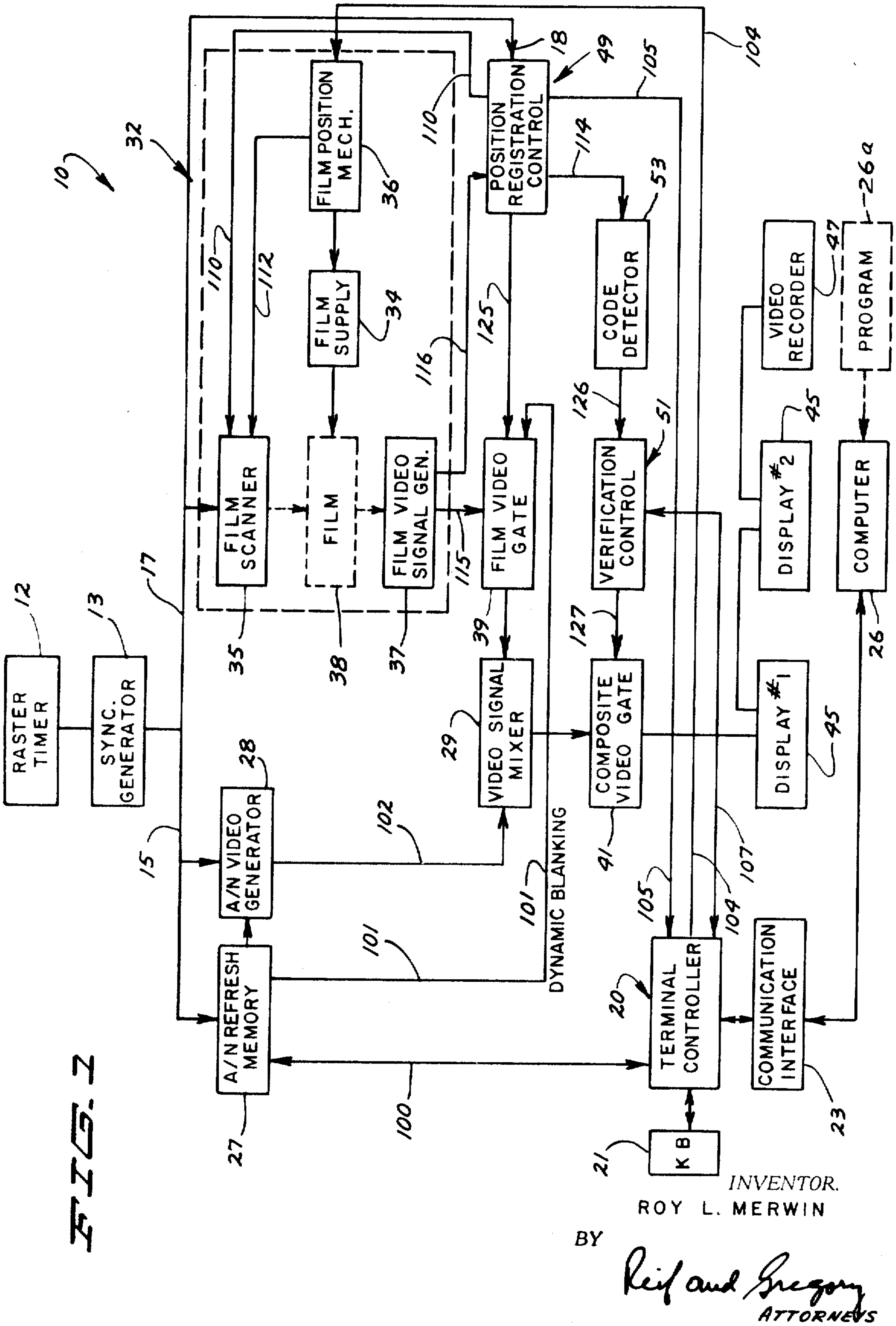

A general layout of the apparatus comprising the invention herein is presented in the drawings in the form of functional flow diagrams and with reference to FIG. 1, the layout of the apparatus is indicated generally by the reference numeral 10. The elements of apparatus indicated herein are shown connected by directional lines which are a diagrammatic representation of the conventional circuitry which will be used to connect the elements of apparatus making up the system as herein disclosed and described.

For purpose of illustration in the instant embodiment of the invention here described it is indicated that the static data source comprises microfilm. It will be understood that other sources of static data may comprise film slides, video tape, microfiche, or a suitable video camera and the like.

It will be assumed herein that a specific operation has been programmed and that a program thereto has been loaded into an associated computer to dictate the specific operation of the system and to provide desired dynamic data. A keyboard is utilized for use in conjunction with the computer as will be described. Providing a suitable computer appropriately programmed including instructions and a schedule of identification codes for the operation to be carried out is a known practice in the art.

BASIC STRUCTURE

The basic structure of the system herein will be described first and reference is made to FIG. 1.

The timing sequence of the integration of video signals as will be described is governed by a timing means 12 indicated here as a raster timer in connection with a sync generator 13 which generates signals 15 and 17 which relate respectively to dynamic or computer source data video signals and to static source video signals and also signals 18 are generated running to a position registration control means 49 hereinafter to be described. Said raster timer and sync generator are similar to like apparatus described in U. S. Pat. No. 3,345,458 and 3,338,391.

The apparatus indicated generally by the reference numeral 32 is provided for handling the source material for static data and converting it into a video signal which data for purposes of illustration is herein described as being contained on microfilm 34 which will be within a suitable container. A film positioning control means or mechanism 36 operates and controls the film supply to retrieve and position any designated frame of said film into focus with respect to a reading or scanning means 35 which may be in the form of a flying spot scanner. The positioned film frame is shown by dotted line and is indicated by the reference numeral 38. Said scanning means will have direct communication with a film video generator 37 which will convert the signals on light beams received from said scanning means into video signals which in turn are transmitted through a transmission control means or film video gate 39 into a video signal mixer 29. Said apparatus 32 is similar to that described in U. S. Pat. Nos. 3,604,850, 3,619,483, 3,621,121 and 3,700,795. The film positioning mechanism 36 is similar to like apparatus described in U. S. Pat. Nos. 3,429,436 and 3,555,248.

Integrated with the above apparatus is the apparatus with respect to the storage, retrieval and display of dynamic data and the control and display of said static data. Dynamic data and instructions will be loaded by appropriate programming into a suitable conventional computer facility 26 which is in communication with a terminal control means or controller such as described in U.S. Pat. Nos. 3,345,458 and 3,388,391, by means of a conventional and suitable interface 23, such as described in FIGS. 10–43 of U.S. Pat. No. 3,500,336, which may be a direct connection to a computer or embody other means of connection. An operating program **26*a*** is indicated in dotted line in connection with said computer.

Said terminal controller has in communication therewith by means of line 100 a random access core memory 27 similar to like apparatus described in U.S. Pat. Nos. 3,345,458 and 3,388,391 and which is further described for purposes herein as being an alpha numeric or A/N refresh memory. Said terminal controller is connected to said film position control means 36 by line 104 and has connection to a position registration control means 49 by line 105 and apparatus similar to said control means 49 is disclosed in U. S. Pat. No. 3,403,391. Bi-directional communication is had between said terminal controller 20 and a verification control means 51 by line 107 which control means is similar to that disclosed in U. S. Pat. No. 3,629,840. Line 107 represents a cable or plurality of lines as will be indicated.

Said refresh memory 27 is connected to said film video gate 39 by line 101.

Said refresh memory 27 has communication with an alpha numeric or A/N video signal generator 28 which is generally disclosed in the same U.S. Pats. referred to with reference to said refresh memory 27 and which in turn transmits dynamic video signals to said video signal mixer 29 which has communication with a selective composite video gate 41 which runs to a plurality of display monitors 45 and/or to a suitable video copier or recorder 47. Said video gate 39 and signal mixer 29 are similar to the structure disclosed in FIG. 61 of U.S. Pat. No. 3,500,336.

A keyboard 21 of conventional design has bi-directional communication with the system through the terminal controller 20.

The position registration means 49 is connected to the film scanner 35 by line 110 and the film positioning means 36 is connected to said film scanner by line 112. The film video signal generator 37 has a line 115 running to the film video gate 39 and a line 116 running to said position registration control 49. The A/N video signal generator 28 is connected to said video signal mixer 29 by line 102.

Only those communication lines necessary to a description of the operation herein and not otherwise clearly obvious have been or hereinafter will be indicated by reference numerals and the connection of said lines is known in the art.

Figure 4:
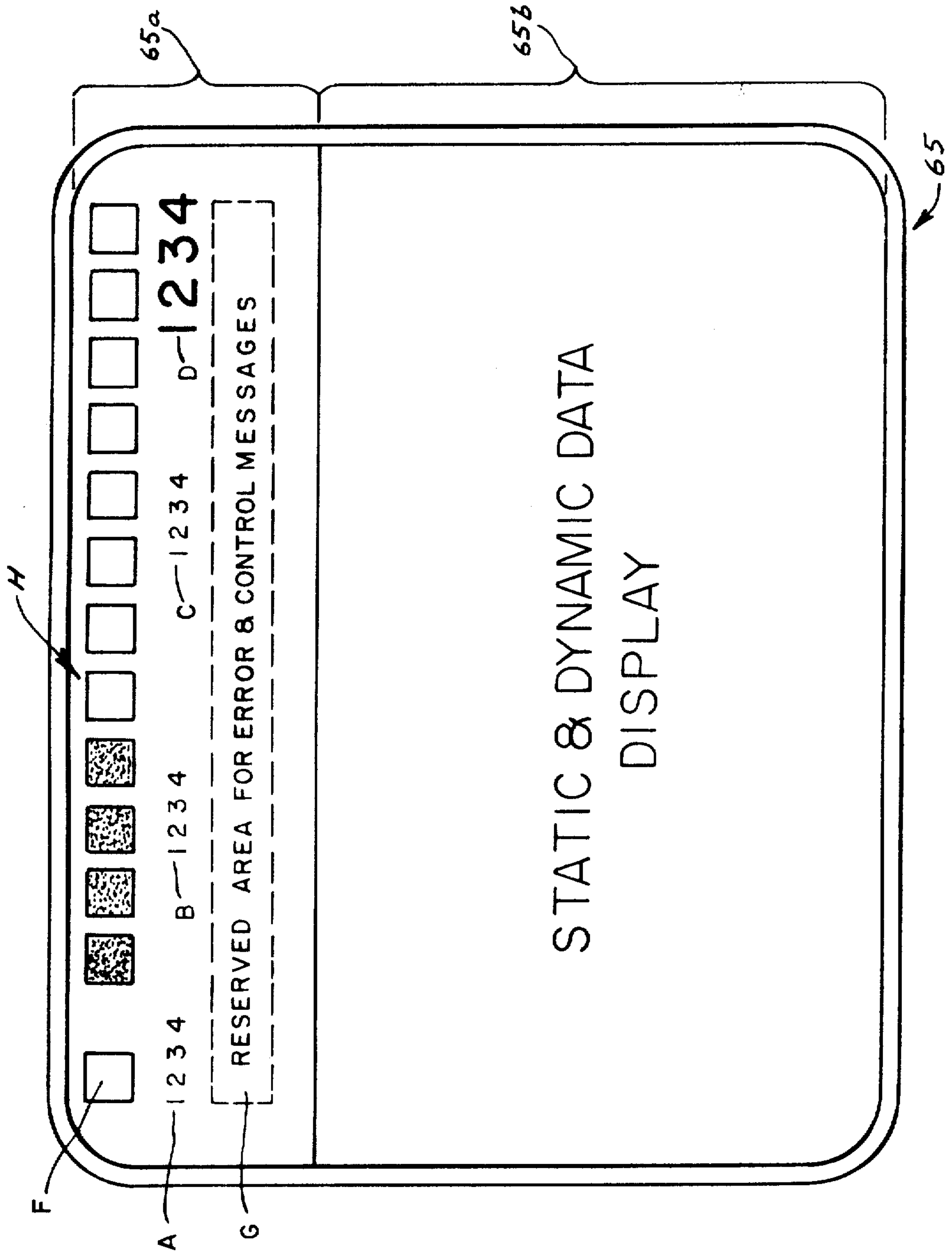
FIG. 4 is a diagrammatic view of a monitor screen showing specific detail thereon.

It will be understood that each film frame shall have an identification code which is here disclosed as being in binary code as indicated by H in FIG. 4 and which will be converted to digits for display such as the identification or I/D code C indicated in FIG. 4 and which will be further described. Each film frame may also have a corresponding numeric or digital identification code such as indicated by D in FIG. 4.

BASIC OPERATION

It will be understood that the raster timer and sync generator will be operating continuously during the operation of the system to synchronize the dynamic and static video signals generated.

The instructions including a table of I/D codes for film frame selection form part of the operating program or dynamic **26*a* programmed material which will be loaded into the computer 26.** The keyboard may be operated to transmit I/D codes to the computer for specific film frame selection, and the entire operation following for the display of data will be automatic. It will be understood that the operation herein with the exception of the optical scanning means is an electronic operation.

The I/D codes for film frame selection in accordance with the programmed instructions in the computer are transmitted from the computer through the terminal controller 20 to the film position control means 36 for the selection and retrieval of the designated film frame and for positioning the same as at 38 into focus with the film scanner 35. The film video signal generator 37 receives the scanning signal and converts the scanned material into a film video signal which passes through the film video gate 39 into the video signal mixer 29. The film positioning means 36 through line 112 blanks the film scanner 35 during the time that the film is being positioned.

The above description indicates generally the transmission of static data from a film source to the video signal mixer. The concept herein embodies the conversion of other specific source forms of static data into video signals in connection with the system herein.

The dynamic data programmed into the computer in being utilized is transmitted by the computer through the terminal controller 20 to the refresh memory 27 and thence to the A/N video signal generator 28 for conversion into a video signal for transmission to the video signal mixer 29 and thereafter the mixed or composite video signal passes to the composite video gate 41 and as will be further described the output therefrom goes to the visual displays 45 and/or to a video copier or other storage means as may be desired.

The refresh memory 27 and the video signal generator 28 are characterized as being alpha numeric or are referred to as A/N but it will be understood that alpha numeric is here used in a sufficiently broad sense as to include symbolic or graphic representations.

The video signal mixer 29 puts out a composite video signal representing an integration of the dynamic and static video signals.

Programmed instructions as well as dynamic data comprising text material are transmitted to said refresh memory 27 for specific control of and integration with the static data to be displayed. The instructions are transmitted from the computer through the terminal controller 20 to said refresh memory 27 and thence by line 101 to said film video signal gate 39 to control or blank the transmission of film video signals therethrough. Thus by blanking the transmission of a film video signal through said gate 39, the transmission of specific static data is stopped at any desired point of said data in a correct time sequential relatively with respect to the dynamic data that there may be a substitution or insertion of dynamic data. Thus specific portions of static data may be updated, changed, or blocked from viewing as desired without requiring a change of the source material such as a change of the film or film frame itself.

More specifically with respect to blanking, the A/N video signal generator 28 and the film scanner 35 are in precise synchronism by means of the sync generator 13. In generating a film video signal, the sync generator transmits signals to the film scanner which causes the scanner to generate a raster in synchronism with the alpha numeric video generator 28. The raster optically projects its light through the film which becomes detected by the film video generator 37. For each scan line in the raster the video generator generates a video signal. This signal is fed through the film video gate 39 into the video mixer 29. Hence the film video signal is in synchronism with the A/N video signal.

The film video gate 39 functions to blank selective portions of film video signals as commanded by a signal derived from the respective character locations in the refresh memory 27. This allows the blanking and unblanking of film video signals for any selected character positions by programmed commands from the computer. Any one or any selected number of character locations may be blanked by prohibiting the passage of film video through said film video gate. Throughout a film frame, for example, there may be one or more instances of selective blanking. This technique of blanking or stopping transmission of static data is referred to as dynamic blanking.

Altho the output of the video signal mixer 29 and the composite video gate 41 is here shown to be in the form of a visual display, it will be understood that within the concept herein said output may take other forms such as being recorded by a video recorder or other storage facility for a subsequent visual display.

In connection with the basic structure and operation above described, the general description given is supplemented by the following description of precise registration of positioning static source data with dynamic data and the description of the verification of the identity of each frame of static subject matter or data.

Precise registration and verification in connection with the system herein and the dynamic blanking technique above described represent a substantial improvement in the art.

POSITION REGISTRATION

Figure 2:
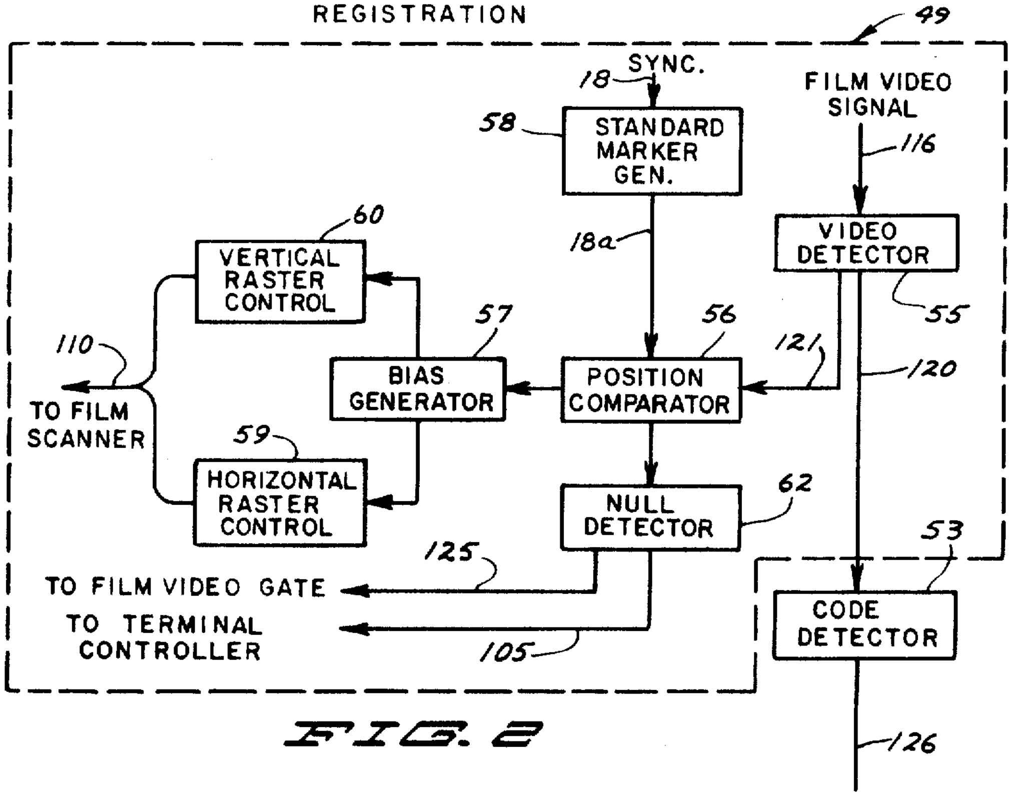
FIG. 2 is a flow diagram with reference to the function of registration.

The registration control means 49 comprises the detailed structure set forth in FIG. 2 and which structure is similar to that disclosed in U. S. Pat. No. 3,403,391. Each film frame will have a frame position or alignment marker such as the position marker F displayed in FIG. 4. This marker will be compared with an electronically generated marker derived from horizontal and vertical sync signals by the standard marker generator 58.

The frame position marker F is optically scanned by the film scanner 35 and is converted into a video signal by the film video generator 37 with this signal being sent by line 116 to the video detector 55. Line 121 from the video detector 55 transmits the video signal generated from marker F to the position comparator 56.

A position comparison indicating a null means that the film video marker signal F is in phase with the standard marker signal generated by standard marker generator 58. Said position comparator 56 transmits an error signal to bias generator 57 if the film marker is not in registration with the standard marker as indicated by a comparison signal other than a null indication. Said standard marker is not here shown and no showing is made of a null condition. It is believed that such showing is not necessary.

Said error signal consists of both horizontal and vertical error signal information which is issued respectively to a horizontal deflection raster control means 59 and to a vertical deflection raster control means 60 which by line 110 communicates with the film scanner 35 to adjust the position of the film scanning raster to be in registration with electronically predetermined signal locations. This is an automatic fine tuning process which is continuous until a null is received. A signal indicating an absence of a null condition is also sent to the null detector 62 for the purpose of communicating with the computer through the terminal controller 20 to notify the computer that position registration is not achieved and for the entry of programmed error messages into the A/N refresh memory 27 for display as indicated by G. The computer is programmed to transmit a position error message to the terminal to be displayed at G, FIG. 4, if a null indication is not achieved within a prescribed amount of time. Similarly when a position registration is achieved said null detector through line 105 communicates with the terminal controller 20 and through it with the computer 26 to indicate position registry and to allow display of the dynamic data from the refresh memory providing indentity verification is achieved as will be described.

IDENTITY VERIFICATION

Figure 3:
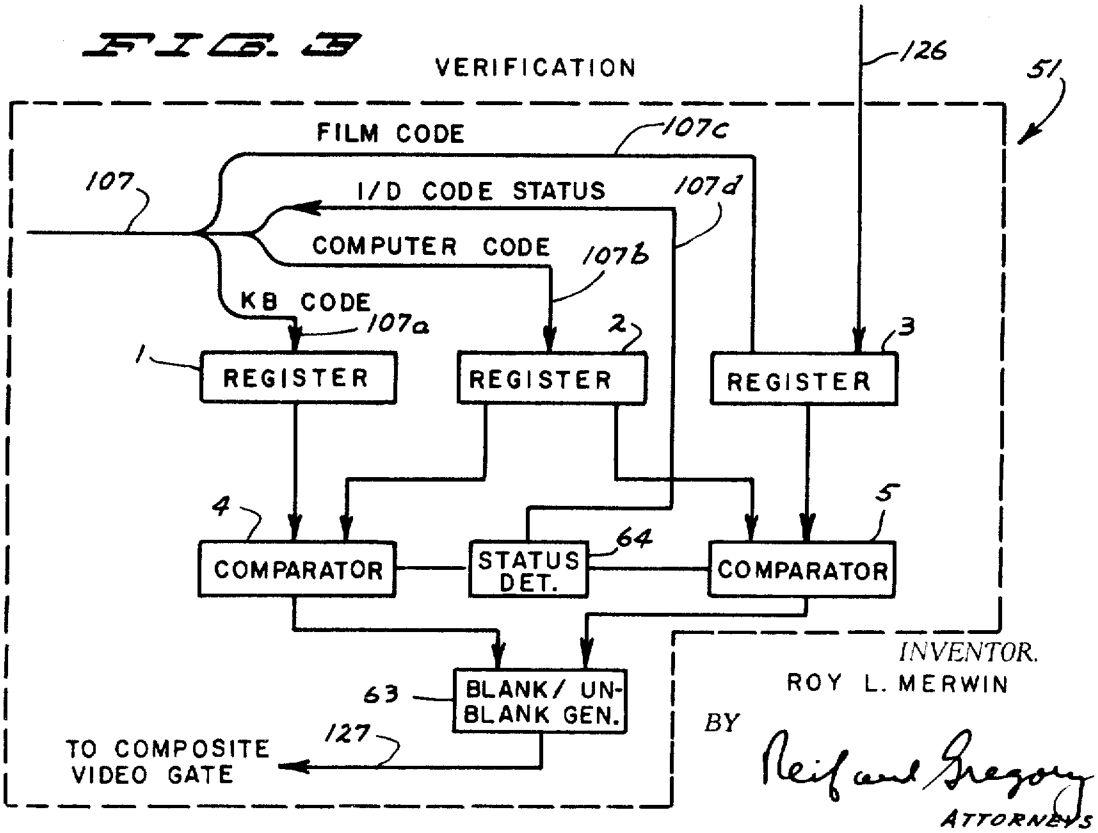
FIG. 3 is a flow diagram with reference to the function of verification of identity of data.

The verification control means 51 comprises the detail of apparatus shown in FIG. 3 and in connection with the display in FIG. 4. This apparatus for verification may be referred to as verification logic and as above indicated is similar to the structure disclosed in U. S. Pat. No. 3,629,840.

As above described each film frame will have an I/D code as in the form of a series of dots or squares. Such an I/D code is here indicated as being in a binary code form which is converted to digit form for display as will be described.

With reference to the display on the monitor screen 65 shown in FIG. 4, the film I/D code as derived in the ways as will be described and for purpose of illustration is indicated as to one film frame is presented in digital form by the reference characters A-D and in binary form by the reference character H.

The registers 1–3 indicated in FIG. 3 are storage registers and the comparators 4 and 5 and the blanking and unblanking generator 63 all represent conventional equipment. For the purpose of describing one operational step, commencement may be had with the use of the keyboard 21 to enter an identification location code of a specific film frame such as frame "1234" or a key word search term. The keyboard indicated I/D code passes directly through the terminal controller 20 by way of line 107 to register 1 and by way of the refresh memory 27 and intervening apparatus, said identification or I/D code will be displayed on the screen portion 65a as indicated by the reference character A. At the same time the controller 20 communicates the I/D code to the computer 26 through the intervening apparatus and with respect to verification, the computer then does the following things. The computer transmits the designated I/D code to the position control mechanism 36 by way of line 104 through the terminal controller 20 for the selection of the designated film frame, with the I/D code in digit form. The computer also sends the I/D code to the terminal controller for transmission by way of line 107b to register 2. Further the computer transmits said I/D code by way of the refresh memory 27 for display on the screen portion 65a as indicated by the reference character B. If the I/D code is a key word term, the computer program decodes the key word and returns a digital I/D code for transmission as above described.

The film frame is selected by said position control mechanism 36, the I/D binary code on the film frame is scanned and is transmitted from the video generator 37 by line 116 to the video code detector 55 and it passes therefrom by way of line 120 to the code detector and converter 53 which is similar to like structure disclosed in U. S. Pat. No. 3,629,840 and which decodes the video signal to generate the digit I/D code. From said code detector 53, the I/D code from the film frame will pass to register 3 by way of line 126. The I/D code from register 3 is also transmitted by line 107c through the terminal controller 20 and through the refresh memory 27 for display as indicated by the reference character C. The code detector 55 exercises discrimination in transmitting registration marker signals to the position comparator 56 and the identification code signals to the code detector and converter 53.

The contents of registers 1 and 2 are compared by a comparing means or comparator 4. The contents of registers 2 and 3 are compared by a comparing means or comparator 5. Said comparators communicate with said selective blanking/unblanking generator 63. Said generator normally permits only the passage through the composite video gate 41 of sufficient scan line for display on said screeen portion **65*a*** for visual observation of the I/D codes A-D, H and the error and control messages, if any are displayed.

Said generator does not permit the transmission of data on scan lines for portion **65*b*** of said screen until it has received an unblanking signal from each comparator.

With the codes in agreement as compared, said comparators unblank said generator 63 and the data for display on screen portion **65*b* is permitted by said generator to pass through said composite video gate 41**.

In addition to the I/D codes displayed corresponding to the contents of the three registers, there is also a visual showing of the I/D code from the film frame as at D in FIG. 4 which is a display of the digital form of the code on the film frame as scanned direct from the film video generator through the film video gate 39 and through the video signal mixer 29 to the composite video gate 41 and therethrough for display.

In the event that verification agreement is not had between the registers 1 and 2 or 2 and 3, an error condition will be detected by the comparator status detector 64 as to either pair of registers and an error signal is sent therefrom to the computer 26 by way of line **107*d* through the terminal controller 20 and the related apparatus and in accordance with the programmed instructions an error condition message will be transmitted by the computer through the terminal controller 20, refresh memory 27 and intervening elements of apparatus for display onto the portion 65*a* of the screen 65 as indicated by the reference character G in FIG. 4**. The error message will alert the operator who will also be able to detect this kind of error condition present by visual comparison of the I/D codes displayed.

In connection with the system herein disclosed, the operator can operate in a "browse mode" by means of a function key in the keyboard 21 through the terminal controller 20 can retrieve specific film frames for review without computer intervention by operation of the film position mechanism 36 and the data on said film frames will be scanned and displayed in the manner above described. Thus there may be a display only of static data.

The operator may also operate in a "data entry mode" by means of function keys in the keyboard 21. The operator can change program instructions for static data modification and can also change instructions for control of dynamic data and can change the dynamic data in the computer.

The operator operates in said "data entry mode" by using a function key in said keyboard and through the terminal controller determining position of the display cursor with respect to character location in the refresh memory 27 as to where blanking and unblanking shall occur. The operator enters or deletes data at desired locations. Each character entered automatically blanks the character it replaces and the new character is displayed. The modification made in the refresh memory is then transmitted to the computer 26 as a modification of the dynamic data therein and/or of the control of said dynamic data.

The above operation in "browse" and "data entry" modes results from a conventional operation of the keyboard in connection with the system described herein and no attendant specific description is believed necessary.

It will be understood that the elements of apparatus embodied within the system herein described and taken separately are conventional pieces of equipment requiring no specific description of their construction or function. Reference has been made to several U. S. Patents for description of similar apparatus to indicate that what has been characterized herein as conventional apparatus is known in the art and that the assembly of the apparatus herein is within the knowledge of one learned in the art. The circuitry required to hook-up the various pieces of apparatus of the system require no specific description. The apparatus referred to operates in manner known in the art to carry out the functions described. The novelty herein is present in the co-operative arrangement of the equipment to convert data of dissimilar character such as material from a film source and from a computer source to reduce both types of data to video signals and to integrate the signals to produce a composite output in precise registration and verified.

Further novelty is present as indicated in writing into the controlling program such instructions as to control the selection and display of static data with the control embodying blanking out specific elements of static data and the substitution or addition of dynamic data and/or deletion of static data. Thus static data which for the most part may represent stable information may be readily updated or modified for any given presentation by appropriate instructions being included in the program used to operate the system.

The updating facility of the system herein as well as the arrangement of the equipment to permit the blanking technique and the technique for providing precise registration and verification of the data presented represents a significant improvement.

The storage of data in a computer facility is expensive. By means of the system herein vast quantities of data may be stored on relatively inexpensive film or on like inexpensive means. By placing only limited quantities of data in a computer facility, computer storage costs and system transmission time are greatly reduced and this represents a significant reduction of expense which would otherwise be incurred.

Thus it is seen that there has been provided herein a relatively low cost and efficient arrangement of equipment as to represent a novel improvement in the art in the presentation of a composite video signal.

It will be understood that various changes may be made without departing from the scope of the invention in carrying out the objects set forth in view of the apparatus disclosed and defined in the claims.

What is claimed is:

1. A composite display system converting data from independent sources into video signals and combining the same for a composite display having in combination, a computer comprising a programmed data source including instructions for selection of data from a second data source, means comprising a second data source, position control means selecting data from said second data source, terminal control means coupled to said computer receiving programmed instructions therefrom and transmitting the same to said second mentioned means for said selection of data from said second data source, means reading said last mentioned data and converting the same into video signals, a video signal mixing means, gating means controlling the passage of said video signals from said fourth mentioned means to said last mentioned means, a memory bank receiving data from said computer data source through said control means, said memory bank being coupled to said gating means and receiving programmed instructions with said data from said computer data source through said control means for the selective control of the passage of said second source data through said gating means, a signal generating means coupled to said memory bank receiving data therefrom and converting the same into video signals transmitted to said fifth mentioned means, said fifth mentioned means integrating video signals from said second data source and from said computer data source forming a composite signal for output, a composite video gating means coupled to said last mentioned means receiving video signals therefrom, means coupled to said last mentioned means receiving said video signals therefrom for display and/or recording, and timing means synchronizing said video signals from said computer data source through said memory bank with said video signals from said second data source.

2. The structure set forth in claim 1, wherein said memory bank comprises a random access magnetic core memory.

3. The structure set forth in claim 1, including video signal synchronization means coupled with said fourth mentioned means adjusting the position of the same to be in registration with a predetermined location.

4. The structure set forth in claim 3, including means generating a standard synchronization marker signal, said second source data including a registration marker for synchronization with said standard marker signal, said fourth mentioned means converting said registration marker into a video signal, said position control means comparing the synchronization of said first mentioned marker signal with said second mentioned marker signal as to the position by said position control means of said second source data, said position control means being coupled to biasing means which communicates with said fourth mentioned means adjusting the position of same to synchronize said registration marker signal of said second source data with said first mentioned marker signal, and said last mentioned means being coupled to said gating means transmitting video signals therethrough upon synchronization of the respective positions of said marker signals.

5. The structure set forth in claim 1, including means verifying identification of data from said second source comprising, a plurality of pairs of registers, comparing means for each pair of said registers, said terminal control means coupled to said comparing composite video gating means through said comparing means to control transmission of data through said composite video gating means, a keyboard coupled to said computer through said terminal control means, said data from said second source including an identification code signal, said keyboard through said terminal control means transmitting said code signal to a first register of a first pair of registers and through said terminal control means transmitting said code signal to said computer, said computer transmitting through said control means said code signal to the second register of said first pair of registers and further transmitting said code signal to said position control means for the selection of second source data, a second pair of registers comprising one register of said first pair of registers, the other register of said second pair of registers receiving said identification code signal from said fourth mentioned means, one of said comparing means receiving said identification code signals from said first pair of registers for comparison thereof and the other of said comparing means receiving said identification code signals from said second pair of registers, a blanking/unblanking signal generator controlling transmission of data through said composite video gate, and said first and second mentioned comparing means actuating said blanking/unblanking signal generator.

6. The structure set forth in claim 5, including a display means, said keyboard being coupled to said memory bank transmitting said identification code signal therefrom to said display means, said keyboard instructing said computer to send an identification code signal through said memory bank to said display means, the register of said second pair of registers which receives said identification code signal from said fourth mentioned means transmitting said code signal through said terminal control means and said memory bank to said display means, and means actuating said composite video gating means for transmission of said identification code signals to said display means for visual observation thereof.

7. The structure set forth in claim 6, including said fourth mentioned means reading the identification code of said second source data converting the same to a video signal, and means transmitting said video signal to said display means.

8. The structure set forth in claim 6, including a comparator status detector coupled to said comparing means detecting an identification code signal error condition, said detector being coupled through said terminal control means to said computer and upon detection of an identification error condition, said detector commands an error message to be sent by said computer to said display means to indicate a failure of comparison of said identification code signals.

9. A composite display system converting data from independent sources to video signals and combining the same for a composite display having in combination, a computer comprising a programmed data source, means comprising a second data source, said second data source embodying identification codes,
said programmed data source embodying identification codes corresponding to said identification codes of said second source data,
position control means selecting data from said second source data,
means converting said second source data into video signals,
means receiving and mixing said video signals,
gating means controlling the passage of said video signals from said third mentioned means to said last mentioned means,
terminal control means communicating with said computer receiving data therefrom for transmission to said position control means for the selection and retrieval of data from said second source,
said terminal control means coupled to a memory bank transmitting data from said computer data source to said memory bank,
means coupled to said memory bank receiving data therefrom and converting the same into video signals and transmitting said video signals to said means mixing video signals,
said video signal mixing means integrating said video signals from said second data source and from said computer data source forming composite signals,
a composite video gating means coupled to said video signal mixing means receiving said composite signals,
means verifying the identification codes with respect to said second source data,
said last mentioned means controlling transmission of data through said last mentioned gating means,
means receiving said composite signals from said gating means displaying and/or recording the same.

10. The structure set forth in claim 3, wherein
said video signal position synchronization means comprises,
means generating a standard synchronization signal,
said second source data embodying a synchronization signal,
means comparing synchronization of said signal from said standard signal generator with said signal from said data to detect an absence of said synchronization,
means detecting and separating said second mentioned synchronization signal from other video signals,
means detecting synchronization of said second mentioned synchronization signal and said standard synchronization signal,
biasing means in connection with said comparing means generating repositioning signals,
said biasing means being coupled with said reading means to adjust the same for synchronization of said synchronization signal from said data with said standard synchronization signal, and
said detecting means being coupled to said terminal control means and through it to said computer to instruct said computer to transmit data.

* * * * *